Jan. 25, 1944.  P. A. STURTEVANT  2,340,277
SPRING TESTING DEVICE
Filed April 17, 1941   2 Sheets-Sheet 1
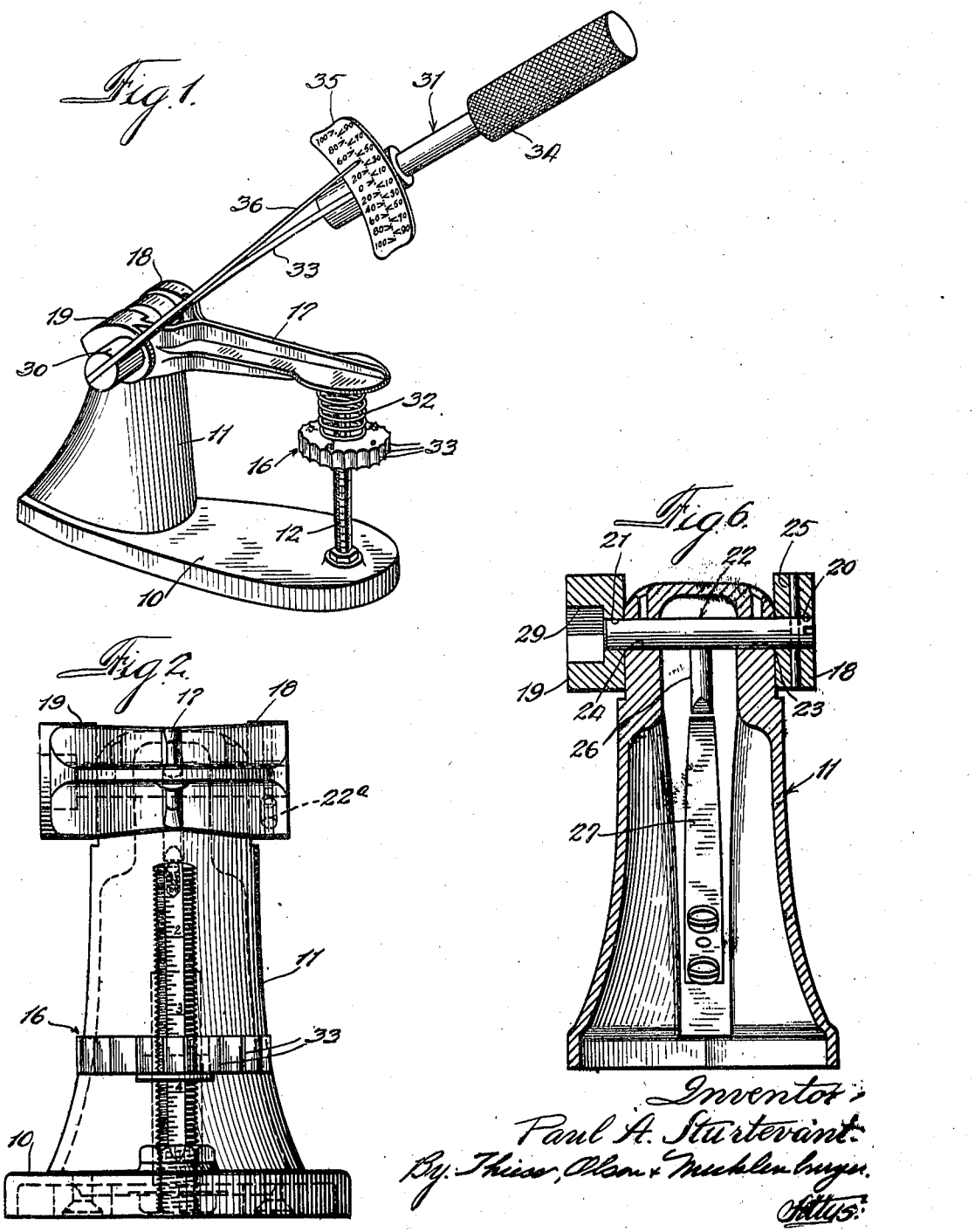

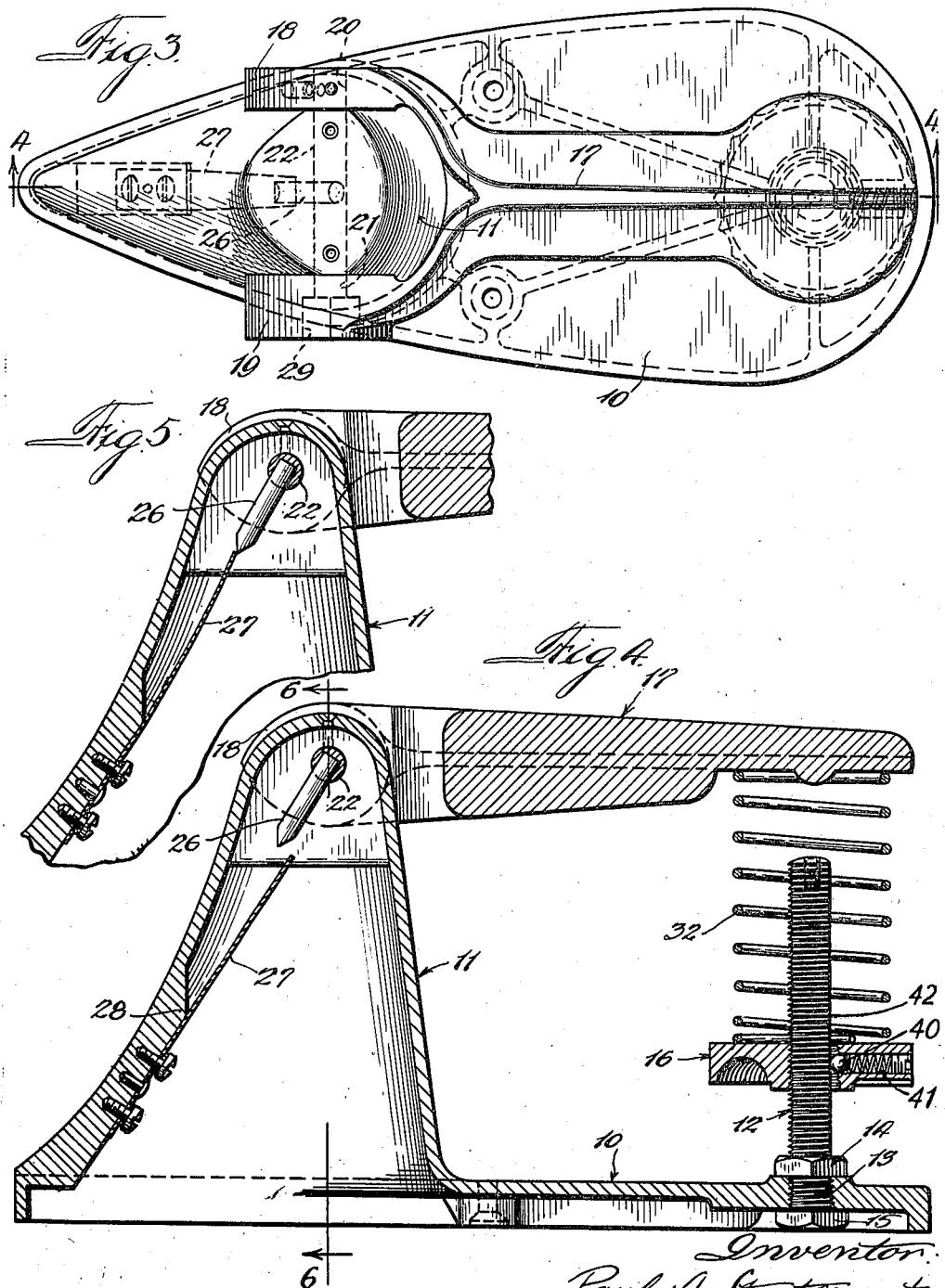

Patented Jan. 25, 1944

2,340,277

UNITED STATES PATENT OFFICE 2,340,277

SPRING TESTING DEVICE

Paul A. Sturtevant, Addison, Ill.

Application April 17, 1941, Serial No. 388,933

21 Claims. (Cl. 265—18)

This invention relates to a testing device and has special reference to a device for accurately measuring the force required to compress a spring to a predetermined overall length and for testing objects that are to be subjected to compression and extension stresses.

More particularly, this invention relates to a testing device comprising a base having a calibrated column mounted thereon and a platform adjustably supported by the column, there being a tongue mounted on the base and having a free end thereof movable toward and away from the column. The calibrations of the column determine the length of the spring to be tested and measuring means are employed for actuating the tongue to apply a compressing force to a test piece between the platform and the tongue to a predetermined calibration on the column.

In accordance with the present invention the means for measuring the compressing force applied to the test piece is the means that actuates the member that applies such force. Thus the actuating member may be a measuring wrench such as is ordinarily employed for applying a tangential force to an object to be rotated and for measuring the applied force. A base having a fixed member with an adjustable platform and a member movable relatively thereto for supporting the test piece therebetween co-operates with the measuring wrench. Such an assembly may be of simple form and comparatively inexpensive to manufacture.

It is, therefore, one of the objects of this invention to provide a testing device of the character indicated above which is simple and convenient in operation, is comparatively inexpensive to manufacture, and is durable.

Other objects and advantages of this invention will hereinafter be more particularly pointed out and, for a more complete understanding of the characteristic features of this invention, reference may now be had to the following description when taken together with the accompanying drawings, in which latter:

Figure 1 is a perspective view of the testing device embodying the features of this invention;

Fig. 2 is a front elevational view of the testing device shown in Fig. 1 with the measuring-actuating means omitted therefrom;

Fig. 3 is a top plan view of Fig. 2;

Fig. 4 is a central longitudinal sectional view taken on the line 4—4 of Fig. 3;

Fig. 5 is a view similar to Fig. 4 of a fragmentary portion thereof showing a changed position of an actuating member thereof; and Fig. 6 is a vertical sectional view taken on the line 6—6 of Fig. 4.

Referring now to the drawings, the testing device embodying the features of this invention comprises a base formed preferably of cast iron having a horizontally extending portion 10 and a hollow upright portion 11 extending thereabove and at one end thereof. A calibrated column 12 is mounted on the horizontally extending portion 10 of the base at the other end thereof, one end of the column being threaded in an aperture 13 of the base and being locked against rotative movement relative thereto by lock nuts 14 and 15 on opposite faces of the base.

A platform 16 is adjustably supported by the column 12, the platform having an axial aperture which is threaded to threadedly engage the column 12. A spring detent means designated broadly as 40 may be arranged in any suitable way as by inserting the same in a hole 41 in platform 16 so as to yieldably bear against a flat face 42 on column 12 carrying the calibrations shown in Fig. 2. Thus the platform 16 is adapted to be fixed to the column 12 in various positions of longitudinal adjustment since the platform may be revolved on the column to raise or lower the platform with respect to the column. The upper face of the platform may be calibrated with a plurality of equidistant markings near the periphery thereof.

A tongue 17 is mounted on the upright portion 11 of the base and has a free end thereof movable toward and away from the column 12. The tongue 17 is preferably formed with a bifurcated end forming arms 18 and 19, the arms straddling the hollow upright portion 11 of the base at the upper end thereof. The arms 18 and 19 are provided with apertures 20 and 21, respectively, for receiving opposite ends of a rod 22, the rod extending through suitable apertures 23 and 24 in the side walls of the hollow upright portion 11 of the base. The arm 18 is fixed to the rod or shaft 22 by a pin 25 which pin extends through the arm 18 and through the shaft 22. An initial positioning of the arm 18 and shaft 22 is obtained by a set screw extending through an opening 22a until the desired relation is determined whereafter the hole is drilled in the arm and shaft for the permanent reception of pin 25. Pivotal movement of the tongue 17 rotates the rod 22 so that the apertures 23 and 24 act as bearings for the rod 22.

A trigger 26 is fixed to and extends radially outwardly from the rod 22 and is movable therewith and with the tongue 17. A flexible member 27 is fixed at one end thereof to an elongated projection 28, the free end of the flexible member being disposed in the path of movement of the trigger 26. Movement of the tongue 17 and thereby the trigger 26 flexes the member 27 and in passing thereby vibrates the flexible member thus causing a vibratory sound.

The arm 19 is provided with a tool-engaging formation 29 in axial alignment with the aperture 21 thereof for receiving an extension of the head 30 of a measuring wrench 31. The tool-engaging formation 29 is preferably polygonal in contour to engage a similarly polygonally contoured extension of the head 30 of the measuring wrench. Rotative force applied to the head 30 by the measuring wrench 31 causes movement of the tongue in a direction toward and away from the column 12.

A test piece, indicated as a coil spring 32, is rested on the platform 16, one end of the test piece engaging the platform and the other end extending upwardly to engage the free end of the tongue 17. In the operation of the construction thus far described, the platform 16 should be set to a predetermined calibration on the column 12. On the front face of the threaded column 12, as indicated more particularly in Fig. 2 of the drawings, a scale is marked in inches and reads from the top down. The divisions on this scale, for purposes of illustration, are in sixteenths of an inch.

As before stated, the platform 16 has inscribed on the upper surface thereof markings which are set apart equidistantly, there being four such markings, reading "0," "1/64," "1/32" and "3/64." In the adjustment of the platform 16, it is rotated until the machined upper surface thereof is in exact alignment with the desired markings on the scale stamped vertically on the column 12. The "0" mark is at the front. Should a setting finer than 1/16" be desired, the platform is rotated clockwise to any marking on its surface which will increase the reading by the amount shown, that is, 1/64", 1/32" and 3/64". A return to "0" on the scale, that is, a complete revolution, increases the length of the setting 1/16". Counterclockwise rotation of the platform decreases the reading. For exceptionally fine adjustments the periphery of the platform has been serrated, as at 33, so that the distance between peaks of the serrations are .003".

In order to test a spring of the character disposed on the platform and illustrated in the drawing, the length at which the spring is to be tested is first determined. This is ordinarily determined by a chart supplied for that purpose. When the length at which the spring is to be tested is determined, the platform is adjusted accurately. For example, in the drawing of Fig. 2, the length of the spring to be tested is 3 1/16". Should, however, it be desired to change the measurement to 2", counterclockwise movement of the platform 16 is had until the surface of the platform is in line with the 2" mark with the "0" mark on the platform to the front. In this condition the spring tester is adjusted to accurately measure the compression on a spring to 2". Should it be desired to test at any other length, the platform is rotated until the marking on the platform corresponds thereto.

After the adjustable platform has been predetermined to the length at which it is desired to measure the spring, the measuring wrench 31 is employed, the polygonal extension of the head 30 being engaged in the tool-engaging formation 29 of the arm 19. The position of the measuring wrench should extend similar to that shown in Fig. 1 at an angle of about forty-five degrees with respect to the base of the machine. In this condition, shown in Fig. 1, the wrench is moved in a direction upwardly until the trigger 26 passes the flexible member 27 when a distinct vibratory sound is heard. The tongue 17 is thereby cocked and ready for use.

The spring or test piece to be tested is rested on the spring platform preferably in axial alignment with the column 12 with the tongue in a cocked position. The handle of the measuring wrench 31 is pulled forwardly until the movable tongue 17 contacts the upper end of the spring 32. A continuation of the pull on the wrench will apply a compressing force to the test piece between the platform and the tongue and continued pressure should be employed until the trigger 26 again contacts the flexible member 27 and passes the same to give it a vibratory sound at the instant when the spring being tested is compressed to the predetermined length pre-set on the column.

At the sound of the vibration a reading is taken on the measuring wrench 31.

The measuring wrench 31 may be of any usual type although, as shown, it comprises, aside from the rigid head 30, a deflecting beam 33 extending from and fixed to the head, and a rigid handle 34 fixed to the free end of the measuring beam to predetermine the effective length thereof. A graduated dial 35 is fixed to the handle and a pointer 36 extending in the direction of and being adjacent to the measuring beam 33 cooperates with the dial to indicate tangential force applied on the handle relative to the object with which the head is in association. The pointer is preferably of a single piece and is fixed at one end thereof to the operating head 30.

It will be understood that other equivalent indicating means may be employed and hence the invention is not to be limited to a sound signal as indicating the time a reading should be taken.

While but a single embodiment of this invention is herein shown and described, it is to be understood that various modifications thereof may be apparent to those skilled in the art without departing from the spirit and scope of this invention.

I claim:

1. A testing device comprising a base, a calibrated column mounted on said base, a platform adjustably supported by said column, a pivoted tongue mounted on said base and having a free end thereof movable toward and away from said column, the calibrations of said column determining the compressed length of the piece to be tested, and force measuring means for actuating said tongue to apply a compressing force to said test piece between said platform and said tongue to a predetermined calibration on said column.

2. A testing device comprising a base, a calibrated column mounted on said base, a platform adapted to be fixed to said column in various positions of longitudinal adjustment, a pivoted tongue mounted on said base and having a free end thereof movable toward and away from said column, the calibrations of said column determining the compressed length of the piece to be tested, and force measuring means for actuating said tongue to apply a compressing force to said test piece between said platform and said tongue to a predetermined calibration on said column.

3. A testing device comprising a base, a calibrated column mounted on said base, a platform supported by said column for receiving a piece to be tested, said platform being adjustable to predetermined positions upon said column, a tongue mounted on said base and having a free end thereof pivotally movable toward and away from said column, the calibrations of said column indicating the position of adjustment of said platform for a predetermined compression of said test piece, measuring means for actuating said tongue to apply a compressing force to said test piece, and means for indicating the compressing force to be read on said measuring means when said compressing force effects said predetermined compression of said test piece.

4. A testing device comprising a base, a calibrated column mounted on said base, a platform adjustably supported by said column for receiving a piece to be tested, a tongue mounted on said base and having a free end thereof movable toward and away from said column, the calibrations of said column indicating the position of adjustment of said platform for a predetermined compression of said test piece, force measuring means for actuating said tongue to apply a compressing force to said test piece, and a sounding means operated by the movement of said tongue adapted to signal the compressive force to be read on said measuring means when said compressive force effects said predetermined compression of said test piece.

5. A testing device comprising a base, a calibrated column mounted on said base, a platform adjustably supported by said column for receiving a piece to be tested, a tongue pivotally mounted at one end thereof on said base and having a free end movable toward and away from said column, the calibrations of said column indicating the position of adjustment of said platform for a predetermined compression of said test piece, force measuring means for actuating said tongue to apply a compressing force to said test piece between said platform and said tongue, a trigger fixed to the pivot of said tongue and movable with said tongue, and a flexible sounding member fixed to said base in the path of movement of said trigger, said flexible sounding member being vibrated by said trigger to signal the compressive force to be read on said measuring means when said compressive force effects said predetermined compression of said test piece.

6. A testing device comprising a base, a calibrated threaded column mounted on said base, a platform threadedly engaging said column for longitudinal adjustment thereon, a tongue mounted on said base and having a free end thereof movable toward and away from said column, the calibrations of said column determining the compressed length of the piece to be tested, and force measuring means for actuating said tongue to apply a compressing force to said test piece between said platform and said tongue to a predetermined calibration on said column.

7. A testing device comprising a base, a calibrated column mounted on said base, a platform adjustably supported by said column, a tongue pivotally mounted at one end thereof on said base and having a free end thereof movable toward and away from said column, a tool-engaging formation on said tongue at the pivotal portion thereof, the calibrations of said column determining the compressed length of the piece to be tested, and force measuring means engaging said tool-engaging formation for actuating said tongue to apply a compressing force to said test piece between said platform and said tongue to a predetermined calibration on said column.

8. A testing device comprising a base having an upright portion thereon, a calibrated column mounted on said base, a platform adjustably supported by said column, a bifurcated tongue on the upright portion of said base and being pivotally mounted thereat, said tongue having a free end thereof movable toward and away from said column, the calibrations of said column determining the compressed length of the piece to be tested, and force measuring means for actuating said tongue to apply a compressing force to said test piece between said platform and said tongue to a predetermined calibration on said column.

9. A testing device comprising a base, a column mounted on said base having a calibrated flat face, a platform adjustably supported by said column, a spring detent on said platform frictionally engaging said flat face in one rotative position of said platform, a pivoted tongue mounted on said base and having a free end thereof movable toward and away from said column, the calibrations on said column determining the compressed length of the piece to be tested, and force measuring means for actuating said tongue to apply a compressing force to said test piece between said platform and said tongue to a predetermined calibration on said column.

10. A testing device comprising a base, a calibrated column adjustably mounted on said base, a platform supported by said column in positions of longitudinal adjustment, a pivoted tongue mounted on said base and having a free end thereof movable toward and away from said column, the calibrations on said column determining the compressed length of the piece to be tested, and force measuring means for actuating said tongue to apply a compressing force to said test piece between said platform and said tongue to a predetermined calibration on said column.

11. A testing machine comprising in combination a base, a platform supported upon said base for receiving a piece to be tested, a tongue having a free end movable toward said platform for applying a compressing force to the test piece on said platform, a pivotal mounting for said tongue also supported upon said base, a handle on one end of said pivotal mounting for rocking said tongue, and means for indicating said compressing force when said test piece is compressed a predetermined amount.

12. A testing machine comprising in combination, a base, a platform supported upon said base for receiving a piece to be tested, a pivotally mounted tongue also supported upon said base and having a free end movable toward said platform for applying a compressing force to the test piece on said platform, means audibly signalling said compressing force when said test piece is compressed a predetermined amount, and means for actuating said pivotally mounted tongue including force measuring means adapted to be read when said audible signalling means operates.

13. A testing machine comprising in combination, a base, a platform supported upon said base for receiving a piece to be tested, a pivotally mounted tongue also supported upon said base and having a free end movable toward said platform for applying a compressive force to the test piece on said platform, a reed, and a pin, said reed and said pin being relatively movable with respect to each other and actuable by movement of said tongue for flexing said reed when said test piece is compressed a predetermined amount.

14. A testing machine comprising in combination, a base, a platform supported upon said base for receiving a piece to be tested, a pivoted tongue on said base movable toward said platform, means for actuating said tongue to apply a compressing force to the test piece on said platform, said means comprising a force measuring means to measure the force applied to said test device by said actuating means, said force measuring means including a dial to indicate the force measuring thereby, and an audible signalling means operable when said test piece is compressed a predetermined amount.

15. A testing device comprising a base, a calibrated column mounted on said base, a platform adjustably supported by said column, a tongue pivotally mounted on said base and movable toward and away from said column, a tool-engaging formation on said tongue at the pivotal portion thereof, the calibrations of said column indicating the position of adjustment of said platform for a predetermined compression of the piece to be tested, force measuring means engaging said tool-engaging formation for actuating said tongue to apply a compressing force to said test piece, and indicating means for signalling the compressive force to be read on said measuring means when said compressive force effects said predetermined compression of said test piece.

16. A device for applying a compressive force comprising a platform adapted to receive the work to which the compressive force is applied, a member for applying the compressive force, an engageable part operably connected to said member, and a handle engaging said part for actuating said member, said handle including measuring means indicating the amount of force being applied by said member.

17. A device for applying a compressive force comprising a platform adapted to receive the work to which the compressive force is applied, a member for applying the compressive force, an engageable part on said member, a handle engaging said part for actuating said member, means on said handle indicating the amount of force being applied by said member, and means actuable by said member for signalling the compressive force to be read on said measuring means when said compressive force effects a predetermined compression of the work on said platform.

18. A device for applying a compressive force comprising a platform adapted to receive the work to which the compressive force is applied, a member for applying said compressive force, and actuating means for said member including a handle member for actuating said member and a force measuring and indicating means carried by and forming a structural part of said handle member.

19. The combination with a base, of a column mounted on said base, a platform supported by said column, for receiving a piece to be tested, a tongue mounted at one end thereof on said base and having a free end thereof movable toward and away from said column, a tool-engaging formation on said tongue, and force measuring means engaging said tool-engaging formation for actuating said tongue to apply a compressing force to said test piece between said platform and said tongue.

20. The combination with a base, of a platform supported upon said base for receiving a piece to be tested, a member also supported upon said base and having a free end movable toward said platform for applying a compressible force to the test piece on said platform, a reed, and a pin, said reed and said pin being relatively movable with respect to each other and actuable by movement of said member for flexing said reed when said test piece is compressed a predetermined amount.

21. The combination with a base, of a platform supported upon said base for receiving a piece to be tested, a member on said base movable toward said platform, means for actuating said member to apply a compressing force to the test piece on said platform, said means comprising a force measuring means to measure the force applied to said test piece by said actuating means, said force measuring means including a dial to indicate the force measuring thereby, and audible signalling means operable when said test piece is compressed a predetermined amount.

PAUL A. STURTEVANT.